(12) United States Patent
Garrett et al.

(10) Patent No.: US 10,627,504 B2
(45) Date of Patent: Apr. 21, 2020

(54) TRACK ASSOCIATOR

(71) Applicant: The MITRE Corporation, McLean, VA (US)

(72) Inventors: Craig Garrett, Colorado Springs, CO (US); Justin Gray, Colorado Springs, CO (US)

(73) Assignee: THE MITRE CORPORATION, McLean, VA (US)

( * ) Notice: Subject to any disclaimer, the term of this patent is extended or adjusted under 35 U.S.C. 154(b) by 395 days.

(21) Appl. No.: 15/812,210

(22) Filed: Nov. 14, 2017

(65) Prior Publication Data

US 2018/0081050 A1 Mar. 22, 2018

Related U.S. Application Data

(63) Continuation of application No. 15/452,348, filed on Mar. 7, 2017, now Pat. No. 9,817,111, which is a continuation of application No. 14/188,725, filed on Feb. 25, 2014, now Pat. No. 9,594,160.

(51) Int. Cl.
  *G01S 13/72* (2006.01)
  *G01S 13/66* (2006.01)
  *G01S 13/87* (2006.01)
  *G01S 13/91* (2006.01)

(52) U.S. Cl.
  CPC ............ *G01S 13/726* (2013.01); *G01S 13/66* (2013.01); *G01S 13/87* (2013.01); *G01S 13/91* (2013.01); *G01S 2013/916* (2013.01)

(58) Field of Classification Search
  CPC ............................................... G01S 13/66–726
  See application file for complete search history.

(56) References Cited

U.S. PATENT DOCUMENTS

| 5,414,643 | A  | * | 5/1995  | Blackman | G01S 13/726 342/95 |
| 5,765,166 | A  | * | 6/1998  | Gotfried | G01S 13/726 707/737 |
| 5,959,574 | A  | * | 9/1999  | Poore, Jr. | G01S 13/726 342/96 |
| 7,289,931 | B2 | * | 10/2007 | Ebert | G01S 13/87 702/150 |
| 7,548,184 | B2 | * | 6/2009  | Lo | F41G 7/008 244/3.15 |
| 7,884,754 | B1 | * | 2/2011  | Alouani | G01S 13/726 342/189 |

(Continued)

*Primary Examiner* — Peter M Bythrow
(74) *Attorney, Agent, or Firm* — Sterne, Kessler, Goldstein & Fox P.L.L.C.

(57) ABSTRACT

Disclosed here are system, apparatus, article of manufacture, method and/or computer program product embodiments for track association. An embodiment operates by receiving a first set of track identification data from a first tracking system. The first set of track identification data is associated with a global track identifier (GID). The first set of track identification data associated with the GID is broadcasted to the first tracking system and a second tracking system. A second set of track identification data is received from the second tracking system. The second set of track identification data identifies any tracks of the second tracking system that match the first set of track identification data. The GID is associated with the second set of track identification data.

20 Claims, 12 Drawing Sheets

(56) References Cited

U.S. PATENT DOCUMENTS

| | | | | |
|---|---|---|---|---|
| 8,089,393 B2* | 1/2012 | Nettleton | ............... | G01S 7/003 |
| | | | | 342/175 |
| 8,180,107 B2* | 5/2012 | Broaddus | ............. | G01S 3/7864 |
| | | | | 348/139 |
| 8,711,034 B2* | 4/2014 | Piersol | ................ | G01C 21/206 |
| | | | | 342/357.2 |
| 9,041,590 B2* | 5/2015 | Yanagi | ..................... | G01S 7/04 |
| | | | | 342/59 |
| 9,121,919 B2* | 9/2015 | Furukawa | ............. | G01S 7/003 |
| 9,291,708 B2* | 3/2016 | Ploplys | .................. | G01S 7/295 |
| 2008/0101652 A1* | 5/2008 | Zhao | ................. | G06K 9/00369 |
| | | | | 382/103 |
| 2008/0150787 A1* | 6/2008 | Cummings | ............. | G01S 7/003 |
| | | | | 342/59 |
| 2008/0169968 A1* | 7/2008 | Easthope | ............. | G01S 13/726 |
| | | | | 342/95 |
| 2009/0040094 A1* | 2/2009 | Harada | .................. | G01S 13/87 |
| | | | | 342/59 |
| 2009/0231183 A1* | 9/2009 | Nettleton | ............... | G01S 7/003 |
| | | | | 342/95 |
| 2010/0295719 A1* | 11/2010 | Habib | .................. | G01S 13/723 |
| | | | | 342/36 |
| 2012/0233098 A1* | 9/2012 | Schwoegler | ........... | G06N 7/005 |
| | | | | 706/12 |
| 2012/0313807 A1* | 12/2012 | Yanagi | ..................... | G01S 7/04 |
| | | | | 342/59 |
| 2013/0275034 A1* | 10/2013 | Cronin | ................. | G01S 13/726 |
| | | | | 701/300 |

* cited by examiner

300

| | Global Track ID | Tracking System A | Tracking System B | Tracking System C | Tracking System D |
|---|---|---|---|---|---|
| 312-A | 302-A<br>GF123 | 304-A<br>"A123" | 306-A<br>"B123" | 308-A<br>"C123" | 310-A<br>"D123" |
| 312-B | 302-B<br>GF456 | 304-B<br>"A456" | | 308-B<br>"C456" | 310-B<br>"D456" |
| 312-C | 302-C<br>GF789 | Assigned to Tracking System B | 306-C<br>"B456" | Assigned to Tracking System B | Assigned to Tracking System B |
| 312-D | 302-D<br>GF012 | | | | |
| 312-E | 302-E<br>GF345 | | | | |
| 312-F | 302-F<br>GF678 | | | | |

FIG. 3

TRACK ASSOCIATOR

CROSS REFERENCE TO RELATED APPLICATIONS

This application is a Continuation of U.S. patent application Ser. No. 15/452,348, now U.S. Pat. No. 9,817,111, filed Mar. 7, 2017, which is a Continuation of U.S. patent application Ser. No. 14/188,725, now U.S. Pat. No. 9,594,160, filed Feb. 25, 2014. The listed applications are incorporated herein by reference in their entirety.

STATEMENT REGARDING FEDERALLY SPONSORED RESEARCH AND DEVELOPMENT

Statement under MPEP 310. The U.S. government has a paid-up license in this invention and the right in limited circumstances to require the patent owner to license others on reasonable terms as provided for by the terms of 03111BF0-XR, awarded by the Air Force ESC/NORAD-NORTHCOM.

BACKGROUND

Background

Most tracking systems today do not share track data with other tracking systems for a variety of reasons including differing classification levels, separation of networks, data format incompatibilities, and political or policy issues. However, in certain situations, a number of different organizations require shared situational awareness of air events to effectively respond to national threats and law enforcement concerns. Such information is usually shared by individuals physically communicating with each other via phone or other real-time communication platforms in order to reconcile any differences their respective tracking systems may be indicating.

Such a manual reconciliation of differences can be inefficient and subject to human error. Each tracking system can perform mathematical analysis in order to determine their respective set of local tracks and track numbering scheme. Previous approaches to solve this problem involve either creating a new tracking system or selecting an existing tracking system to act as a 'central authority'. The central authority takes in all of the tracks from the participating tracking systems and performs a mathematical analysis (based on location, speed, etc.) to determine which tracks represent the same physical object, assigns a unique track number to the tracks, and sends these track-to-track mappings along with track updates to the participating tracking systems.

The main problem with this approach is one of trust and autonomy. Because operators of each tracking system are not familiar with other tracking systems and their behavior, they typically do not trust other systems. This ultimately results in the users and developers of each tracking system declining to act on the track-to-track mappings coming from the 'central authority' and demanding that they perform their own track analysis to see if they agree with the central tracking system. Additionally, because the premise of the 'central authority' strategy is one of a downward communication direction of track-to-track mappings to the tracking systems, this approach also does not accommodate disagreements among the tracking systems.

SUMMARY

Provided herein are system, apparatus, article of manufacture, method and/or computer program product embodiments, and/or combinations and sub-combinations thereof, for managing tracks across a plurality of tracking systems.

An embodiment includes a computer implemented method for managing tracks across a plurality of tracking systems. The method operates by receiving a first set of track identification data from a first tracking system. The first set of track identification data is associated with a global track identifier (GID). The first set of track identification data associated with the GID is broadcasted to the first tracking system and a second tracking system. A second set of track identification data is received from the second tracking system. The second tracking system determines whether any tracks of the local second tracking system matches tracks from the first tracking system. The second set of track identification data identifies a track of the second tracking system that matches the first set of track identification data. The GID is associated with the second set of track identification data.

Another embodiment includes an apparatus for managing tracks across a plurality of tracking systems. The apparatus includes a memory and at least one processor coupled to the memory. The processor is configured to receive a first set of track identification data from a first tracking system. The first set of track identification data is associated with a global track identifier (GID). The first set of track identification data associated with a GID that is broadcasted to the first tracking system and a second tracking system. A second set of track identification data is received from the second tracking system. The second tracking system determines whether any tracks of the local second tracking system matches tracks from the first tracking system. The second set of track identification data identifies a track of the second tracking system that matches the first set of track identification data. The GID is associated with the second set of track identification data.

A further embodiment includes a tangible computer-readable device having instructions stored thereon that, when executed by at least one computing device, cause the computing device to perform operations. The operations include receiving a first set of track identification data from a first tracking system. The first set of track identification data is associated with a global track identifier (GID). The first set of track identification data associated with the GID is broadcasted to the first tracking system and a second tracking system. A second set of track identification data is received from the second tracking system. The second tracking system determines whether any tracks of the local second tracking system matches tracks from the first tracking system. The second set of track identification data identifies a track of the second tracking system that matches the first set of track identification data. The GID is associated with the second set of track identification data.

BRIEF DESCRIPTION OF THE DRAWINGS

The accompanying drawings are incorporated herein and form a part of the specification.

FIG. 3 is a block diagram of a track-mapping database, according to an example embodiment.

In the drawings, like reference numbers generally indicate identical or similar elements. Additionally, generally, the left-most digit(s) of a reference number identifies the drawing in which the reference number first appears.

DETAILED DESCRIPTION

Figure 1:
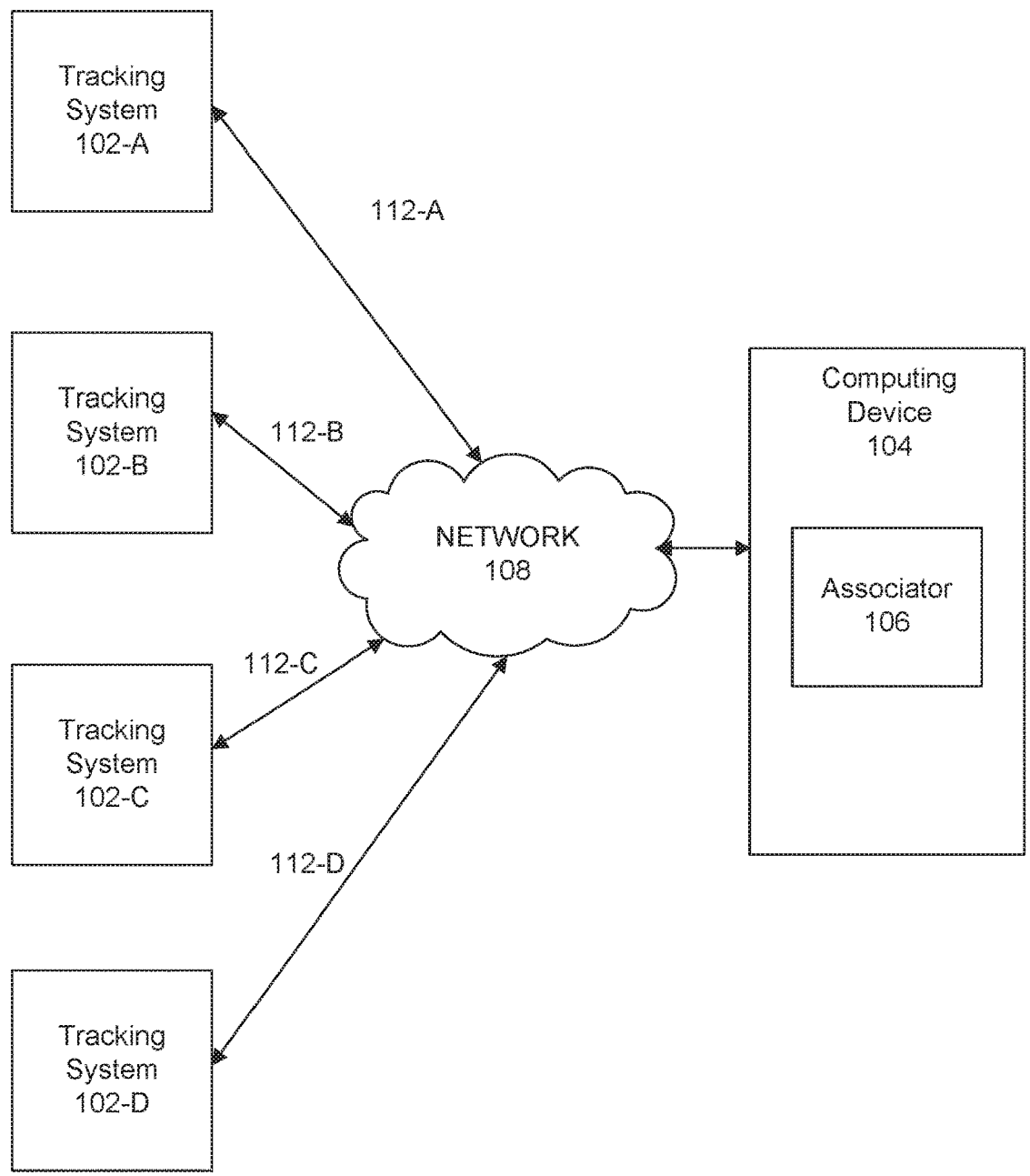
FIG. 1 is a block diagram of a track associator system, according to an example embodiment.

FIG. 1 is a block diagram of an example track associator system 100. Track associator system 100 can be implemented in software, hardware, or a combination of software and hardware. Track associator system 100 may implement a variety of methods, computational algorithms, and heuristics, further described below, according to embodiments of the present disclosure.

Track associator system 100 includes a plurality of tracking systems 102-A, 102-B, 102-C, 102-D and a computing device 104. Computing device 104 includes an associator 106. The plurality of tracking systems 102 and the computing device 104 are coupled via one or more networks 108 and a plurality communication channels 112-A, 112-B, 112-C and 112-D. Network 108 may be any network or combination of networks that can carry data communications. Such a network 108 may include, but is not limited to, a local area network, metropolitan area network, and/or wide area network such as the Internet. Network 108 can support protocols and technology including, but not limited to, World Wide Web (or simply the "Web"), protocols such as a Hypertext Transfer Protocol ("HTTP") protocols, and/or services. Intermediate web servers, gateways, or other servers may be provided between components of the system shown in FIG. 1, depending upon a particular application or environment.

Computing device 104 can include an associator 106 and a database (not illustrated). Associator 106 can be configured to receive a plurality of local track identification data from the plurality of tracking systems 102, assign global track identifiers (GIDs) to each of the plurality of local track identification data and provide management of the plurality of local track identification data and GIDs. Although FIG. 1 illustrates associator 106 as operating on computing device 104, embodiments are not limited to this example configuration. In embodiments, associator 106 may reside across a plurality of computing devices in a distributed computing network system.

The plurality of tracking systems 102 can each include a plurality of processor-based electronic devices that are used to monitor tracks or targets such as aircrafts. For example, tracking systems 102 can provide Radio Detection And Ranging (RADAR) functionalities or Automatic dependent surveillance-broadcast (ADS-B) functionalities for the detection and identification of a track. For instance, each tracking system 102 can be controlled by different organizations which provide Air Traffic Control (ATC) support. In general, the plurality of tracking systems 102 require shared situational awareness of air events to effectively respond to conflicts which may arise in the air, such as national threats and law enforcement concerns. Each tracking system 102 can be comprised of a combination of airport surface detection radar, terminal area radar, long range radar, or ADS-B based equipment. For example, an ADS-B based system operates by periodically tracking a coverage area, broadcasting and managing information associated with an aircraft, such as a track identification (ID) number, current position, altitude, and velocity. An ADS-B based system provides air traffic controllers with real-time position information and additional attributes regarding each aircraft within its respective coverage area.

In an example situation, a tracking system 102 can be a Battle Control System-Fixed (BCS-F) system. In the United States, the BCS-F is a tactical air battle management command and control system that provides the two continental U.S. North American Aerospace Defense Command (NORAD) air defense sectors, as well as U.S. Pacific Command commanders (Hawaii and Alaska Regional Air Operation Centers), with flight tracking and identification support. Air defense operators can employ BCS-F to conduct surveillance, identification, and control of U.S. sovereign airspace and control air defense assets, including fighters, to intercept and identify potential air threats to U.S. airspace. In another example situation, a tracking system 102 can be an Air Marine Operations Surveillance System (AMOSS). Similar to BCS-F, AMOSS can detect, identify and track multiple aircrafts within a particular coverage area. One of skill in the art would appreciate that embodiments are not limited to these example situations.

In general each tracking system 102 is connected to a display, where an operator may view a graphical representation of tracks or aircrafts within its coverage area. In conventional tracking systems, each tracking system 102 is responsible for identifying and monitoring tracks within its coverage area, based on local mathematical and physics calculations. That is, each tracking system detects a track within its coverage area, calculates identification data associated with the track and assigns each track a local track ID number. An operator viewing the graphical representation of this information may be able to see track ID numbers of multiple tracks superimposed on a geographic map, for example. The operator may then select a specific track and view additional identification data associated with the aircraft, such as altitude, speed, and positional coordinates. Thus, in conventional tracking systems, each tracking system operates independently of any other tracking systems and usually has its own local track ID numbering scheme and algorithms for determining what is a track. Such autonomy presents a fundamental challenge. Specifically, how to reconcile each tracking system's different sets of track identification data and track IDs so that each system has as similar an air picture as possible. For example, each tracking system 102 can have differing graphical representations of the same aircrafts within a substantially similar coverage area. This can be due to each tracking system 102 having access to different sensor feeds and different areas of sensor coverage. Additionally, even when tracking systems 102 are receiving data from the same sensors, due to latency and algorithm differences, each tracking system 102 can create air tracks with significant differences in location, velocity, or other identifying characteristics. Each tracking system 102 may also make different decisions regarding a determination of whether what is being detected is a single aircraft flying in a location, or multiple aircrafts flying close together. Embodiments solve this problem, by creating a centralized associator (i.e. associator 106), which provides unique, common track numbers for each aircraft of a tracking system and exchanges this information with all tracking systems 102.

At a high-level, associator 106 operates as follows: each tracking system 102 sends track identification data to associator 106. Track identification data can include local track ID numbers assigned to a track along with characteristics about the track, such as position, speed and altitude. Associator 106 assigns to each received track identification data, a new, arbitraty and unique global track ID (GID). The GID is then broadcasted by associator 106 to each tracking system 102. Tracking systems 102 then perform respective mathematical analysis to determine which of their own local tracks align with the track identification information received from associator 106. As each tracking system 102 determines that a track aligns, the tracking systems 102 sends messages back to associator 106, which include a mapping that links a local track ID to the global track ID. Associator 106 then updates a mapping database (not illustrated) and broadcasts the updated mappings to each tracking system 102. In this way, all tracking systems 102 have common GIDs which aids in properly identifying and communicating information about tracks across organizations and different tracking systems. Additionally, associator 106 is not responsible for performing any mathematical or physics analysis on tracks to determine which tracks are similar. Instead, each tracking system performs its own analysis and calculations and makes such a determination based on those calculations. A more detailed discussion about the operations of associator 102 will be presented below with respect to FIG. 2.

Associator 106 can be software, firmware, or hardware or any combination thereof in a computing device. Associator 106 can be implemented on or implemented with one or more computing devices 104. Computing device 104 can be any type of computing device having one or more processors and memory. For example, and without limitation, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s). A further example of a computing device is described with respect to FIG. 12 below.

It should be noted that computer-readable medium storage embodiments may include any physical medium which is capable of having instructions encoded thereon that may subsequently be used by one or more processors to implement methods described herein. Example physical media may include floppy discs, optical discs (e.g. CDs, mini-CDs, DVDs, HD-DVD, Blu-ray), hard drives, punch cards, tape drives, flash memory, and memory chips. However, any other type of tangible storage medium that can serve in the role of providing instructions to one or more processors may be used to store the instructions in these embodiments.

Figure 2:
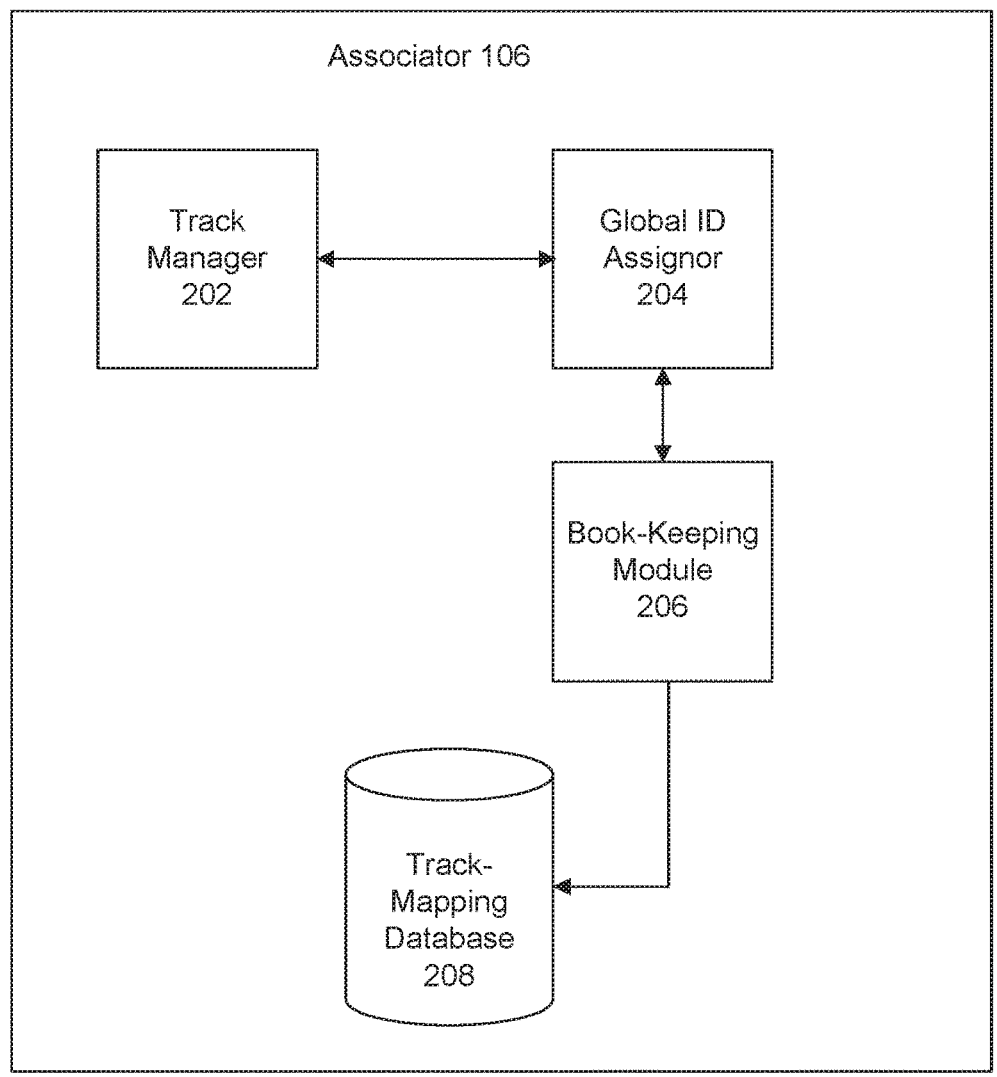
FIG. 2 is a block diagram of an associator, according to an example embodiment.

FIG. 2 illustrates associator 106. Associator 106 includes track manager 202, global ID assignor 204, book-keeping module 206 and track-mapping database 208. As discussed above, associator 106 is configured to provide global management of tracks for a plurality of tracking systems.

In an embodiment, track manager 202 is configured to receive a first set of track identification data from a first tracking system. For example, track manager 202 may receive a first set of track identification data from an organization that is monitoring tracks or aircrafts in a specific coverage area, using RADAR or ADS-B equipment. The first set of track identification data may correspond to information about a particular track that is located within the coverage area of the first tracking system. The first set of track identification data may include attributes that identify the track, such as a local track ID, physical coordinates, altitude and speed. Track manager 202 can be configured to receive the first set of track identification data from the first tracking system via a message, which includes all the above-mentioned attributes. Once, the message is received, track manager 202 may read the message and extract information regarding the track, as necessary.

Global ID assignor 204 is configured to associate the first set of track identification data with a global track identifier (GID), according to an embodiment. For example, once track manager 202 extracts the attribute data from the first set of track identification data, the attribute data may be sent to global ID assignor 204 for further processing and management. Global ID assignor 204 is configured to receive the attribute data and tag the first set of track identification data with a unique GID. Global ID assignor 204 is configured to maintain a list or database of unique GID's that may be distributed or assigned to each track identification data received. A GID may be a combination of characters or numeric values. In this way, the first set of track identification data is linked to a unique GID to create a local track ID to GID pairing. The first set of track identification data linked with the unique GID may then be passed on to book-keeping module 206, which stores the local track ID to GID pairing in track-mapping database 208. Book-keeping module 206 is configured to store and manage the local track ID to GID pairings in track-mapping database 208. For example, book-keeping module 206 may be configured to store the local track ID to GID pairings as a linked list or as a hash map.

In another embodiment, once book-keeping module 206 stores the local track ID to GID pairing, track manager 202 is configured to broadcast the local track ID to GID pairing to the first tracking system and a second tracking system. For example, track manager 202 may broadcast a message including the first set of track identification along with a field in the message including the GID. The message may be broadcasted or sent back to the first tracking system which originally sent the first set of track identification data and a second tracking system. The second tracking system may be another tracking system that is registered to receiving track management information from associator 106. For example, the second tracking system may be operated by another organization that is providing air traffic control support for the same or substantially similar coverage area as the organization operating the first tracking system. The organizations operating the first tracking system and second tracking systems for the same or substantially similar coverage area may be doing so for different purposes. In an example, the first tracking system may be tracking the coverage area for defense or security purposes, while the second tracking system may be tracking the coverage area for general federal aviation purposes.

In an embodiment, once the first tracking system and second tracking system receive the broadcasted message including the local track ID to GID pairing for the first set of track identification data, each tracking system becomes aware of the unique GID assigned to the associated aircraft or track. The first tracking system may store and manage this data locally within the first tracking system. For example, the first tracking system may update its local database by internally mapping the GID to the track associated with the first set of track identification data. The second tracking system, upon receipt of the local track ID to GID pairing information for the first set of track identification data, may perform a check within its own system to identify whether the local track ID to GID pairing information matches any aircrafts or tracks being currently monitored by the second tracking system. When track manager 202 broadcasts the local track ID to GID pairing information to the second tracking system, this is the first time that the second tracking system is notified of the first set of track identification data of the first tracking system. The second tracking system is then configured to examine the first set of track identification data in order to determine if the first set of track identification data matches any tracks or aircrafts within the second tracking system. For example, the second tracking system may be configured to examine the attributes of the first set of track identification data and compare the attributes against tracks within the second tracking system. The second tracking system may compare, for example, the latitude/longitude coordinates, altitude and speed of the first set of track identification data against the latitude/longitude coordinates, altitude and speed of all the tracks being monitored within the second tracking system, When the second tracking system identifies a matching track, the second tracking system is configured to generate a mapping between the local track ID assigned to the matching track within the second tracking system and the local track ID to GID paring of the first set of track identification data. The second tracking system is configured to assign, to the matching track, the GID assigned to the first set of track identification data. Thus, in this way, the second tracking system manages and maintains a link from its own local track to the track of the first tracking system associated with the first set of track identification data.

In an embodiment, once the matching track is assigned the GID, the second tracking system sends a message to associator 106 as a notification of the assignment. The message sent by the second tracking system includes the mapping between the local track of the second tracking system and the local track ID to GID paring of the first set of track identification data, according to an embodiment. Additionally, the message sent by the second tracking system includes a second set of track identification data corresponding to the matching track. Track manager 202 receives the message including the mapping and second set of track identification data corresponding to the matching track. Global ID assignor 204 is configured to extract track identification data for the matching track from the message and provide the data to book-keeping module 206, according to an embodiment. Book-keeping module 206 is then configured to update track-mapping database 208. In this example, book-keeping module 206 will link the information associated with the matching track with the first set of track identification data and the GID. In this way, associator 106 is configured to maintain a linked relationship between all common tracks across a plurality of tracking systems via unique GIDs. Once book-keeping module 206 updates track-mapping database 208, track manager 202 is configured to broadcast the update to all the tracking systems, according to an embodiment. Thus, the first tracking system will be notified that the second tracking system has a track which matches the track associated with the first set of track identification data.

In the example above, it is possible for a disagreement to occur between tracking systems regarding a particular track. For example, once associator 106 assigns a GID to a track provided by the first tracking system and broadcasts the assignment, the second tracking system may determine that it does not have any matching tracks within the second tracking system. When the second tracking system determines that there are not any matching tracks, this can be an indication that the second tracking system is not picking up the track of the first tracking system or the second tracking system disagrees with the information being provided by the first tracking system. In either scenario, the second tracking system has the autonomy to disregard or log the data provided for the first tracking system. The second tracking system may then send a message to associator 106 indicating that there is no match. In this example where there is a disagreement, the second tracking system may send to associator 106 a message including the track identification data for the track which it believes to be the correct track information regarding a particular track, according to an embodiment. Associator 106 is then configured to receive the message and assign a second unique GID to the received track identification data. The second GID assignment is then broadcasted to all tracking systems, thus notifying all tracking systems of the disagreement. In another embodiment, the second tracking system will not send a message when it is determined that there are no matching tracks with the first tracking system. When associator 106 does not receive a message from the second tracking system, this is an implicit indication that there is no match. Associator 106 is configured to receive and update local track ID to GID pairings periodically, according to an embodiment. For example, associator 106 may receive and update local track ID to GID pairings once every second or less. Embodiments are not limited to a once every second or less interval of time, as a person of ordinary skill in the art would appreciate that an update can occur at different times intervals (i.e. once every minute) depending on the functionality and requirements of the respective tracking systems. Likewise, associator 106 may broadcast updated local track ID to GID pairings to all registered tracking systems at the same interval of time.

FIG. 3 illustrates a track-mapping database 208 which may be updated by associator 106 periodically, according to an embodiment. As illustrated, track-mapping database 208 includes a plurality of rows 312-A, 312-B, 312-C, 312-D, 312-E and 312-F. Each row corresponds to a global track ID (GID) 302-A, 302-B, 302-C, 302-D, 302-E and 302-F. GIDs 302 are assigned to tracks of tracking systems 304, 306, 308 and 310 based on the track identification data provided by each tracking system. For example, row 312-A illustrates an instance where tracking systems 304, 306, 308 and 310 provided respective track identification data to associator 106 and were in agreement about the characteristics of the track which appears within the coverage area of their respective tracking systems. Thus, row 312-A illustrates that the track identification data for tracks 304-A, 306-A, 308-A and 310-A share a common GID 302-A (i.e. "GF123"). Hence, the local tracks identified with local track IDs "A123" (i.e. 302-A), "B123" (i.e. 304-A), "C123" (i.e. 306-A) and "D123" (i.e. 308-A) are also tagged with the GID "GF123." It will be appreciated that the convention illustrated by FIG. 3 are for example purposes and embodiments are not limited to this example. For example, embodiments do not require the local track ids from respective tracking systems to share any textual similarities with the GM. When an operator of any of the tracking systems hooks any of the above mentioned local tracks, they will be provided the GID along with information indicating that other tracking systems have the same or substantially similar track within their coverage areas.

Rows 312-B and 312-C illustrate a scenario where there is a disagreement by at least one tracking system regarding a track. Row 312-B illustrates that tracking systems 304, 308 and 310 share a common GID 302-B (i.e. "GF456"). That is, tracks 304-B (i.e. "A456"), 308-B (i.e. "C456") and 310-B (i.e. "D456") are assigned the GID value of "GF456". However, in this example, tracking system 306 does not agree with the other tracking systems. A disagreement may occur when a tracking system, through its calculations or understanding of special circumstances regarding a track or coverage area, determines that a track within their own coverage area is different from a track which all other tracking systems may agree is a particular track. For example, tracking system 306 may determine that a particular track within its tracking system is an "enemy" or "hostile" track, which is flying in close proximity to a "friendly" track. While tracking system 306 may be able to identify this distinction of two tracks within its coverage area, the other tracking systems may not be able to pick up this distinction for a variety of reasons. In such a scenario, tracking system 306 can send a message to associator 106 regarding its disagreement with the other tracking systems. As illustrated, in such an example, track 306-C (i.e. "B456") is assigned its own GID "GF789" which is different from the GID assigned to the other tracks. Tracking system 306 then has the autonomy to monitor the track assigned GID "GF789" while the other tracking systems may choose to disregard the information provided by tracking system 306 or log the information for future analysis and investigation. In the example above, tracking system 306 may send dual messages to associator 106 which indicate the two tracks picked up by tracking system 306. In such a scenario, one track may be assigned the GID 302-B, while the second track may be assigned the GID 312-C.

Figure 4:
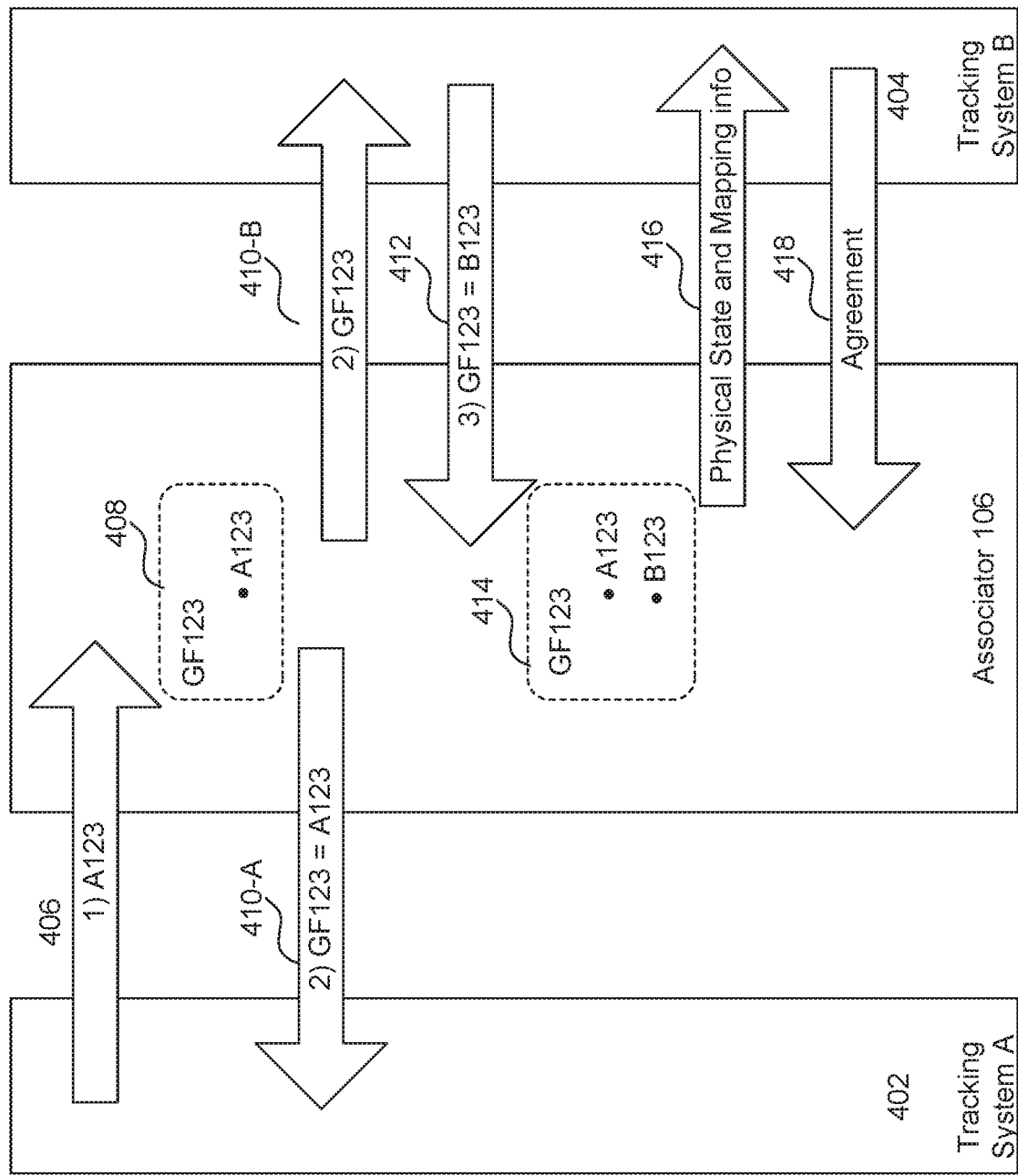
FIG. 4 is a block and flow diagram illustrating an interaction between an associator and a plurality of tracking systems, according to an example embodiment.
Figure 5:
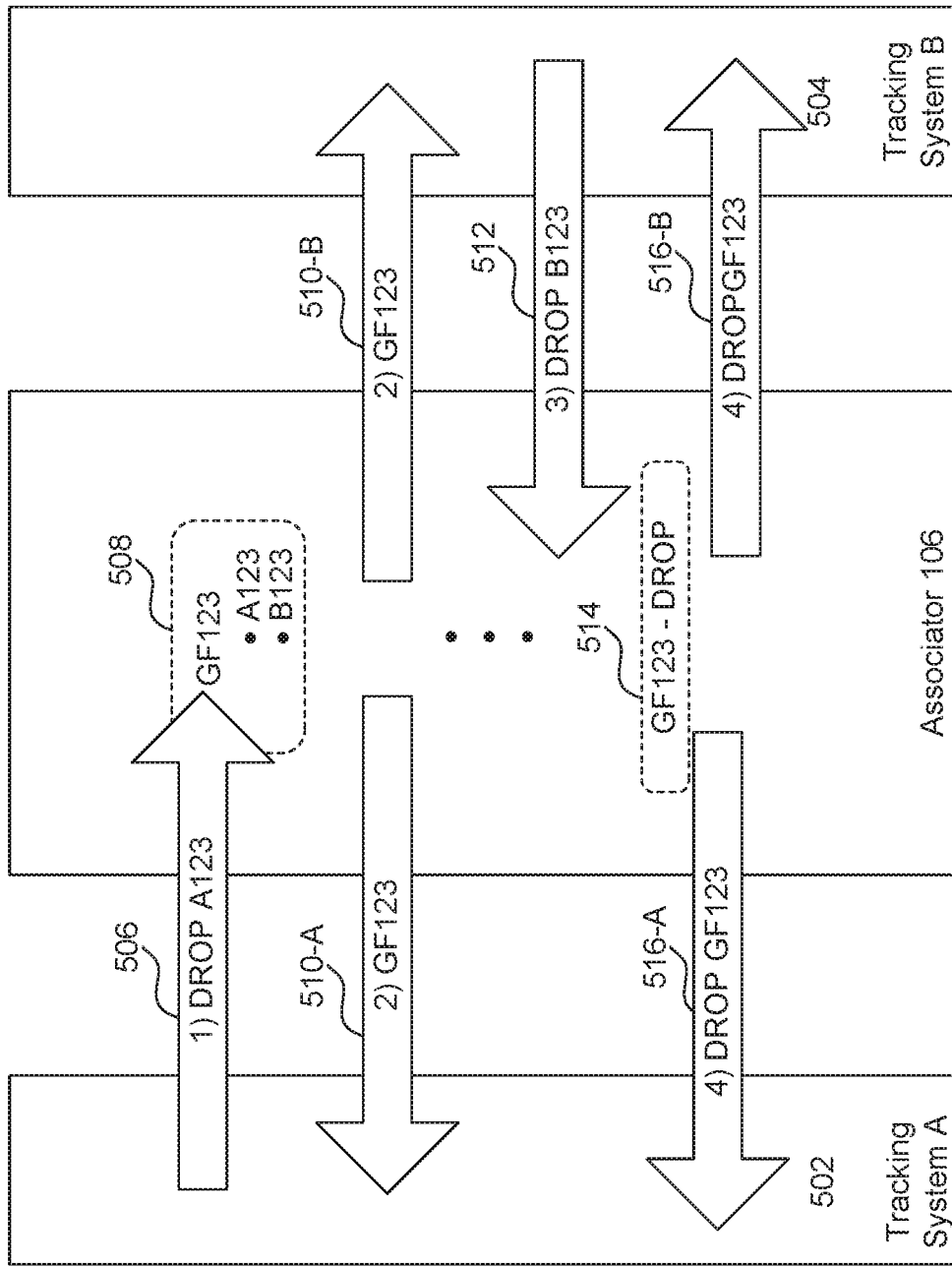
FIG. 5 is a block and flow diagram illustrating an interaction between an associator and a plurality of tracking systems, according to an example embodiment.
Figure 6:
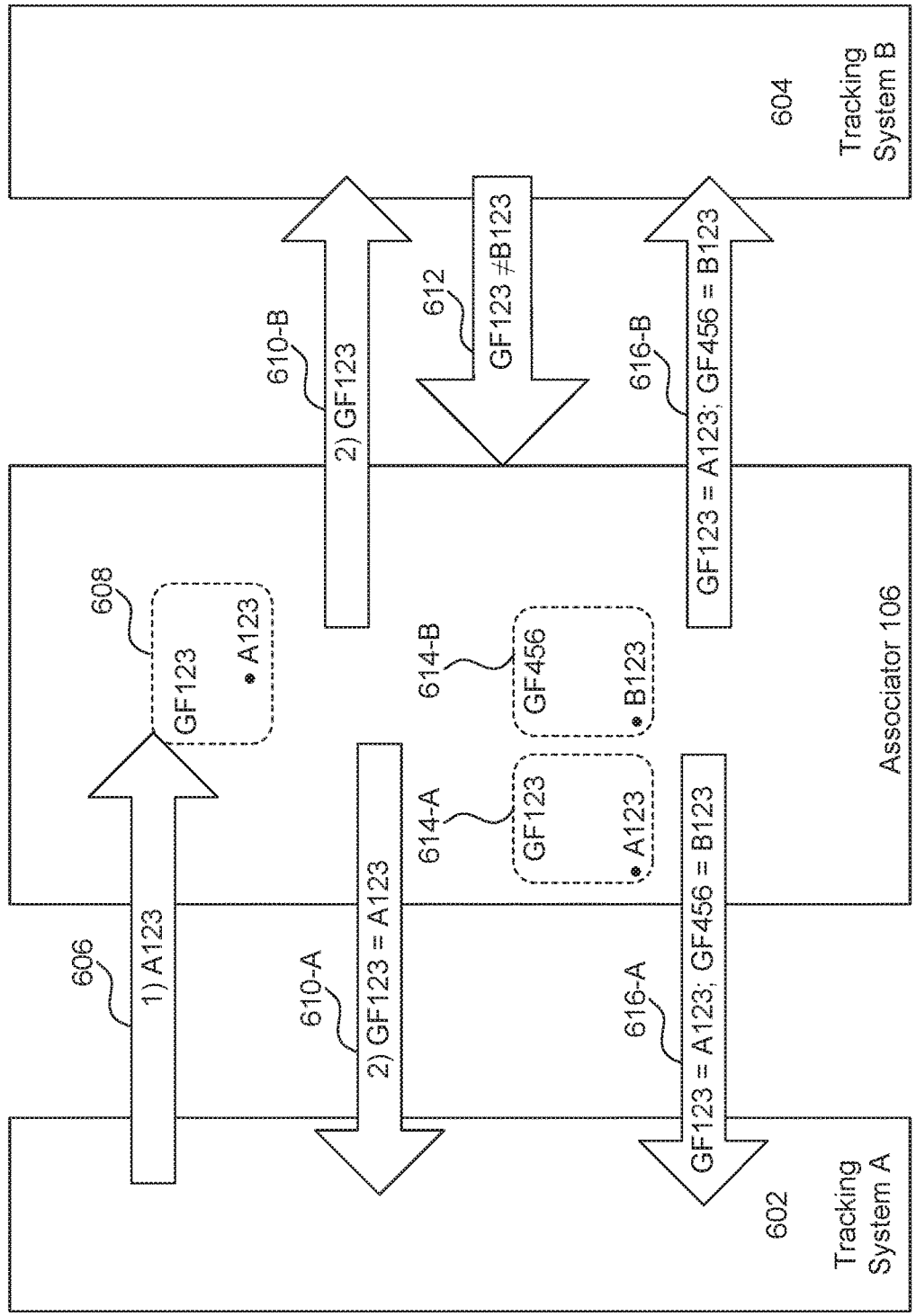
FIG. 6 is a block and flow diagram illustrating an interaction between an associator and a plurality of tracking systems, according to an example embodiment.

FIG. 4, FIG. 5 and FIG. 6 illustrate block diagrams showing example interactions between associator 106 and a plurality of tracking systems. FIG. 4 illustrates an example scenario where two tracking systems are in agreement. For example, at step 406, tracking system A 402 may provide a first set of track identification data with local track ID "A123" to associator 106. In response, associator 106 assigns a GID "GF123" to the first set of track identification data at step 408. Step 408 generates a local track ID to GID pairing. At steps 410-A and 410-B, associator 106 broadcasts the local track ID to GID pairing to tracking systems 402 and 404. When associator 106 sends the local track ID to GID pairing to tracking system 404, it includes physical state information about the track such as location, heading, speed, and Mode3A from tracking system 402, so that tracking system 404 may attempt to correlate that track to one of its internal tracks. At step 412, tracking system B 404 identifies a matching track within its tracking system, links the matching track to GID "GF123" and sends a second set of track identification data with the local track ID "B123" and mapping to associator 106. In the message sent at step 412, tracking system 404 alerts associator 106 that the GID assigned to the first set of track identification data should also be assigned to a second set of track identification data. At step 414, associator 106 updates its database of local track ID to GID pairings and links the global ID "GF123" with tracks "A123" and "B123" of tracking systems 402 and 404. The linked relationship is maintained by associator 106 and is broadcasted to any tracking system which is subscribed to receive information from associator 106. At step 416, associator 106 sends the physical state information and mapping information from step 412 to tracking system 404. As discussed above, the physical state information corresponds to the physical tracking information for the tracks of tracking system 402. At step 418, associator 106 receives an agreement message from tracking system 404. The agreement message indicates that tracking system 404 agrees with the tracking information being reported by tracking system 402.

FIG. 5 illustrates another example form of agreement between tracking systems. In this example, at step 506, tracking system A 502 sends a message to associator 106 indicating that its local track "A123" should be dropped. A track may be dropped if it moves outside of the coverage area of a tracking system, for example. At steps 510-A and 510-B, associator 106 broadcasts the drop track message to all tracking systems including tracking systems 502 and 504. Tracking system B 504 is configured to scan its coverage area and determine if its local track "B123" which was previously linked to track "A123" via the GID "GF123" has also been dropped. At step 512, tracking system B 504 alerts associator 106 that local track "B123" has also been dropped. In response, at step 514, associator 106 removes GID "GF123" from its list of managed tracks and broadcasts this fact to all tracking systems at steps 516-A and 516-B. In this way, associator 106 is configured to de-allocate GIDs when they are no longer being used by any tracking system.

FIG. 6 illustrates an example disagreement between tracking systems 602 and 604. At steps 606, 608, 610-A and 610-B, tracking system 602 provides a first set of track identification data for its local track "A123", which is assigned a GID and the local track ID to GID pairing is broadcasted to all tracking systems. Steps 606, 608, 610-A and 610-B are similar to steps 406, 408, 410-A and 410-B of FIG. 4. At step 612, tracking system 604 sends a message to associator 106 indicating that it does not agree with the first tracking system. The message includes the disagreement along with track identification data for a track which tracking system 604 identifies as the correct track. As discussed above, step 612 is not required according to embodiments. The lack of an agreement message being sent by tracking system 604 can be used to imply a disagreement. In other words, tracking system 604's disagreement with tracking system 602 can be implied if tracking system 604 never sends a message to associator 106. In such a scenario, the track being reported by tracking system 602 remains an external track in tracking system 604. Tracking system 604 may then retain the separate external track and optionally display the external track to users of tracking system 604. At step 614, a new global track ID "GF456" is assigned to local track "B123" of tracking system 604. At steps 616-A and 616-B, associator 106 broadcasts both local track ID to GID pairings to all the tracking systems. In this way, each tracking system is able to have autonomy over its own tracks while also being aware of tracks from other tracking systems, which may be monitoring the same coverage area.

Figure 7:
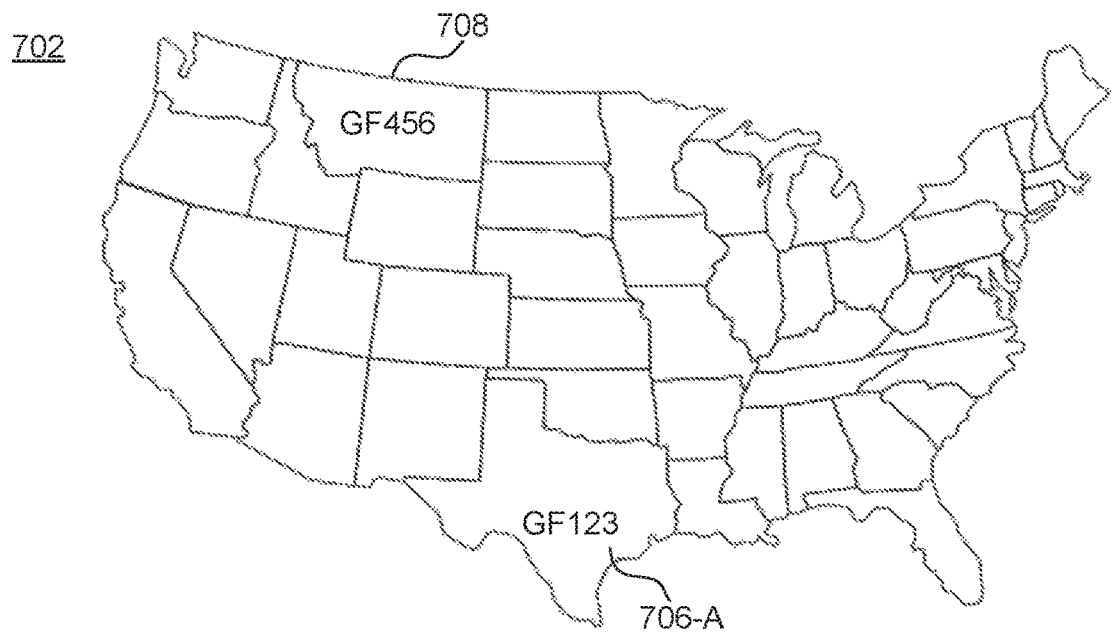
FIG. 7 is a diagram of coverage area maps that may be viewed by operators of different tracking systems, according to an example embodiment.
Figure 7:
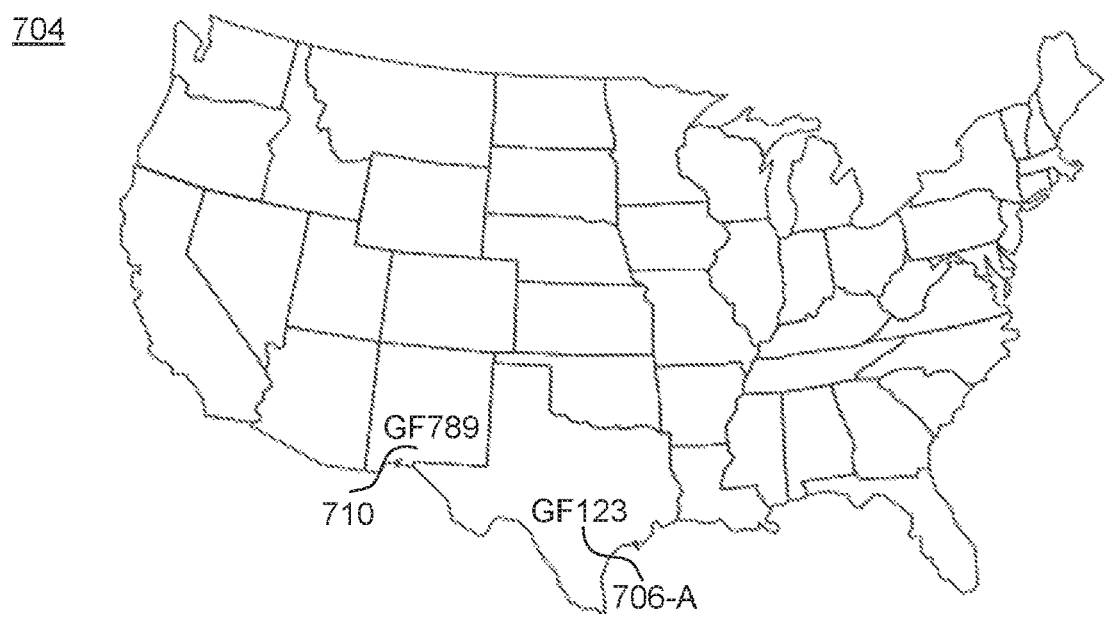

FIG. 7 illustrates example coverage area maps that may be viewed by operators of different tracking systems. For example, an operator of a first tracking system may view coverage area map 702 and another operator of a second tracking system may view coverage area map 704. Coverage area map 702 illustrates that an operator of first tracking system may view tracks 706-A and 708 within its tracking system. Tracks 706-A and 708 may be assigned GIDs "GF123" and "GF456" respectively. Although the tracking systems monitor the same coverage area, the operator of the second tracking system may be provided with a different graphical view. For example, in addition to track 706-A which is assigned global track ID "GF123", the operator of the second tracking system may also view track 710 which is assigned global track ID "GF789". The view difference may be based on a disagreement between tracks, as discussed above. In another example, either tracking system may choose to place tracks that were disagreed upon in a log for further analysis, or may choose to populate the coverage area map with an indication of the disagreement. For example, a tracking system may place a marker at a location where its tracking system does not identify a track, but another tracking system has reported identifying a track. The operator may then hook or select any track or marker on the coverage area map and be presented with detailed information regarding a track, it's GID and its linked relationships.

Figure 8:
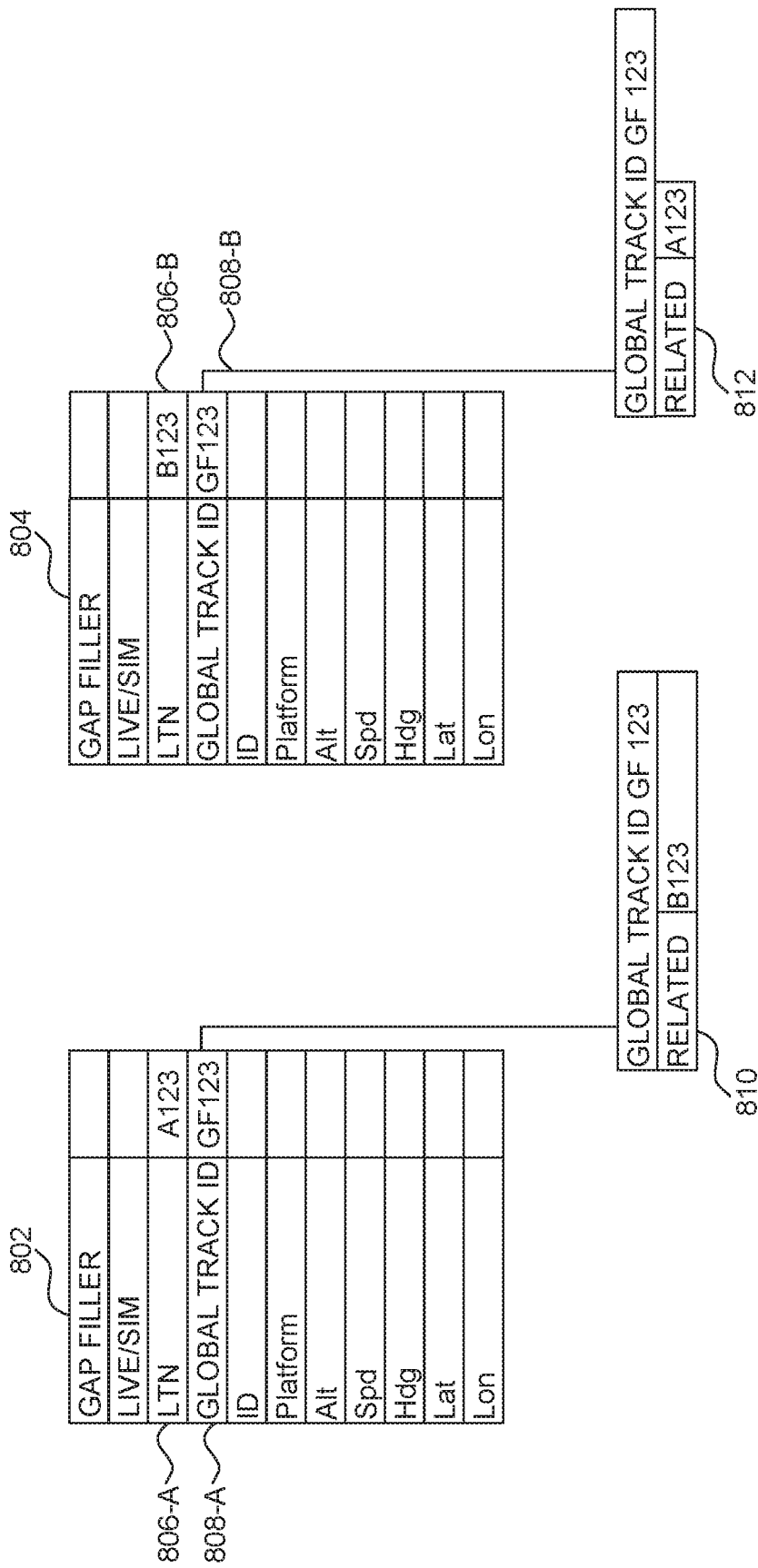
FIG. 8 is a diagram of display information regarding a track, according to an example embodiment.

FIG. 8 illustrates an example display of information regarding a track when an operator hooks or selects a track on a coverage area map. Display 802 corresponds to a first tracking system and display 804 corresponds to a second tracking system. Upon hooking or selection of a track, the operator of a tracking system may be presented with attribute data related to the hooked track. For example, information such as latitude, longitude, speed and altitude may be presented. Additionally, rows 806-A, 806-B and 808-A, 808-B provide information about the local track ID and GID assigned to the track, respectively. As further illustrated, when an operator selects rows 808-A and 808-B, they may be provided with further information regarding other tracks linked to the GID. For example, the operator of tracking system 802 may be presented with information 810 indicating that GID "GF123" is also assigned to track "B123" of the second tracking system. The operator of tracking system 804 may be presented with similar information 812 indicating the linked relationship to track "A123" of the first tracking system.

Figure 9:
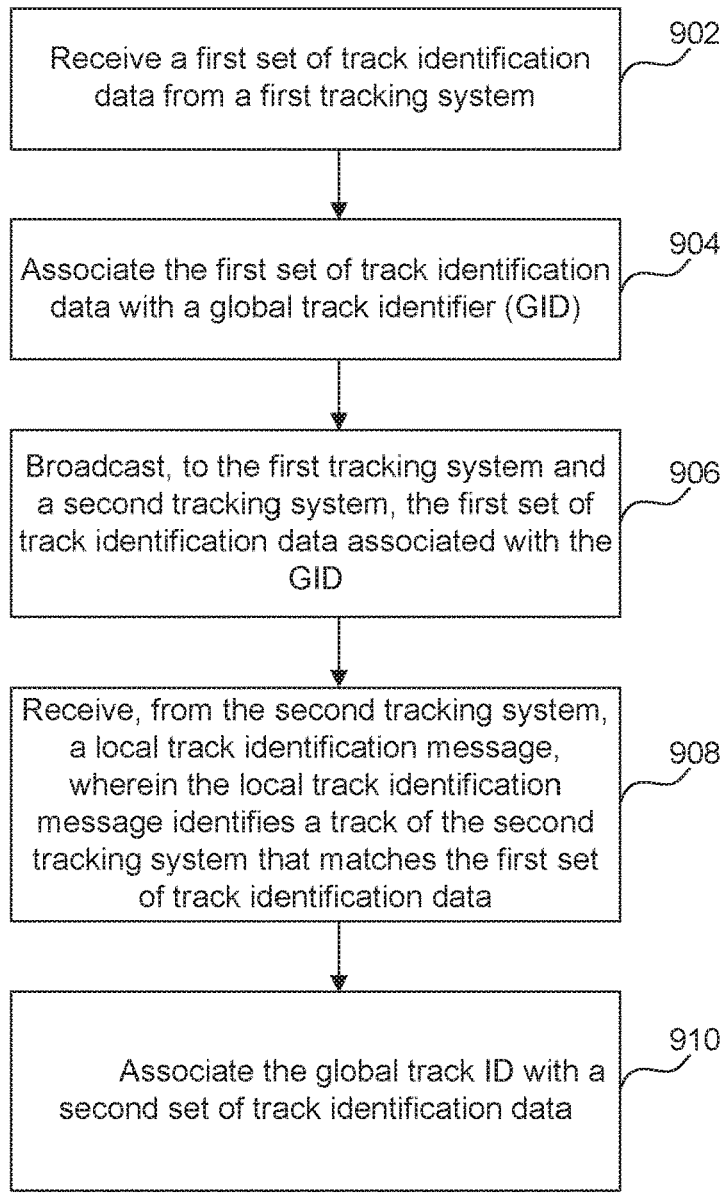
FIG. 9 is a flowchart illustrating a process for managing tracks across a plurality of tracking systems, according to an example embodiment.

FIG. 9 a flowchart illustrating a process for managing tracks across a plurality of tracking systems, according to an example embodiment.

At step 902, a first set of track identification data is received from a first tracking system. For example, step 902 may be performed by associator 106 of FIG. 1 and FIG. 2. The first set of track identification data may be received from an organization that is monitoring tracks or aircrafts in a specific coverage area. The first set of track identification data describes a track that is located within the coverage area. The first set of track identification data may include attribute data that identifies the track, such as a local track ID, physical coordinates, altitude and speed.

At step 904, the first set of track identification data is associated with a global track identifier (GID). For example, step 904 may be performed by associator 106 of FIG. 1 and FIG. 2. A GID can be a combination of alphanumeric characters that are used to track common tracks across a plurality of tracking system. Once the first set of track identification data is received, it is linked to a unique GID to create a local track ID to GID pairing. That is, the local track ID associated with the first set of track identification data is mapped to a GID.

At step 906, the first set of track identification data associated with the GID is broadcasted to the first tracking system and a second tracking system. For example, step 906 may be performed by associator 106 of FIG. 1 and FIG. 2. A message may be broadcasted that includes the first set of track identification data along with the associated GID. The message may be broadcasted back to the first tracking system and a second tracking system. The second tracking system may be another tracking system that is registered to receive track management information. For example, the second tracking system may be operated by another organization that is monitoring the same or substantially similar coverage area as the first tracking system. After the first tracking system and second tracking system receive the broadcasted message including the local track ID to GID pairing for the first set of track identification data, each tracking system becomes aware of the unique GID assigned to the associated track.

At step 908, a second set of track identification data is received from the second tracking system. The second set of track identification data identifies a track of the second tracking system that matches the first set of track identification data. For example, step 908 may be performed by associator 106 of FIG. 1 and FIG. 2. The second tracking system, upon receipt of the local track ID to GID pairing information for the first set of track identification data, may perform a scan and calculations within its own system to identify whether the local track ID to GID pairing information matches any tracks within the second tracking system. When the second tracking system identifies a matching track, the second tracking system is configured to generate a mapping between a local track ID assigned to the matching track and the local track ID to GID paring of the first set of track identification data. This information is packed into a message and received as a second set of track identification data.

At step 910, the GID is associated with the second set of track identification data that matches the first set of track identification data. For example, step 910 may be performed by associator 106 of FIG. 1 and FIG. 2. Upon receipt of the message the information associated with the matching track is linked with the first set of track identification data and the GID. In this way, the GID is utilized to provide and maintain a linked relationship between common tracks among all tracking systems which are the same or substantially similar.

Figure 10:
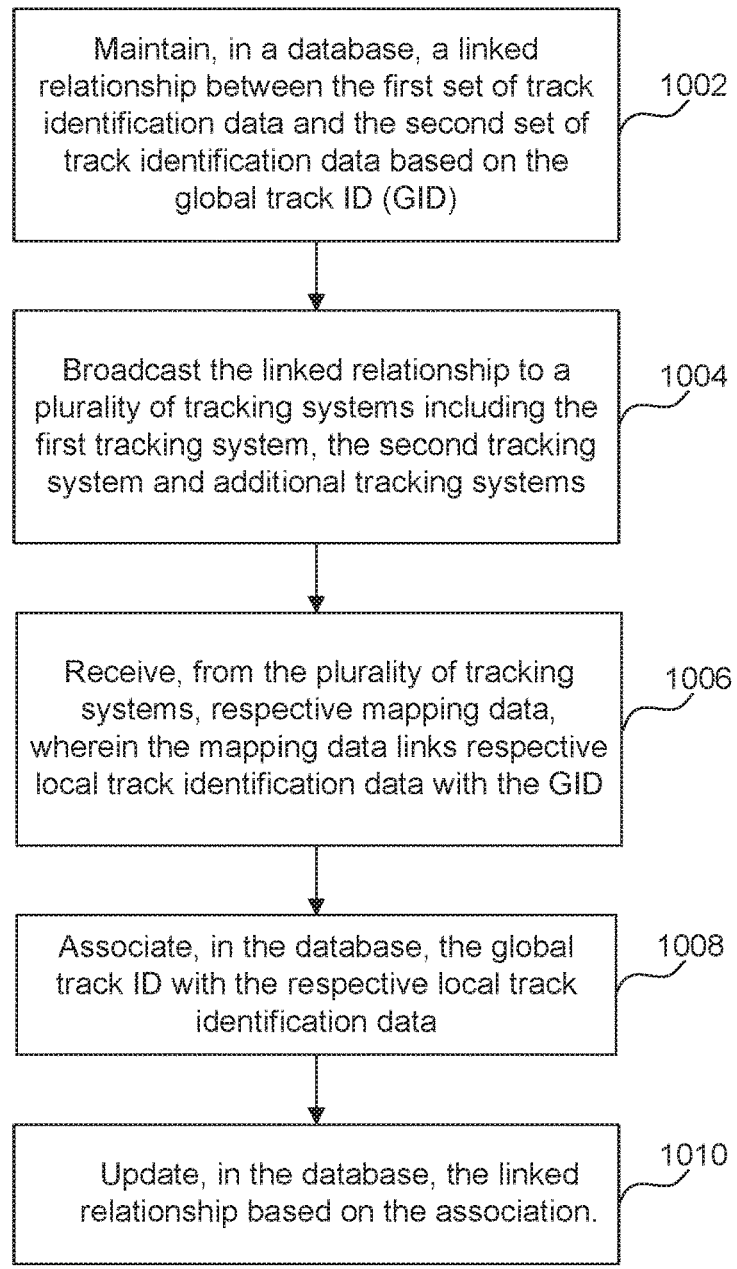
FIG. 10 is a flowchart illustrating a process for managing racks across a plurality of tracking systems, according to an example embodiment.

FIG. 10 is a flowchart illustrating another process for managing tracks across a plurality of tracking systems, according to an example embodiment.

At step 1002, a linked relationship between the first set of track identification data and the second set of track identification data is maintained in a database based on the GID. For example, step 1002 may be performed by associator 106 of FIG. 1 and FIG. 2. Step 1002 is similar to step 910 of FIG. 9. A linked relationship between all common tracks among a plurality of tracking systems may be maintained in a database via a linked list or hash table, where the GID is used to link the common tracks.

At step 1004, the linked relationship is broadcasted to a plurality of tracking systems. The plurality of tracking systems include the first tracking system, second tracking system and additional tracking systems. For example, step 1004 may be performed by associator 106 of FIG. 1 and FIG. 2. The linked relationship is broadcasted to the plurality of tracking systems to notify each track system of common tracks among the plurality of tracking systems. Each tracking system is able to receive the message and easily identify which tracks within their respective tracking systems match other tracks within other tracking systems.

At step 1006, respective mapping data is received from the plurality of tracking systems. The mapping data links respective local track identification data with the GID. For example, step 1006 may be performed by associator 106 of FIG. 1 and FIG. 2. Step 1006 is similar to step 908 of FIG. 9. However, instead of receiving just one set of track identification, the mapping data includes a plurality of track identification data, where each of the track identification data matches the track identification data associated with the GID. In this way, each tracking system indicates an agreement with each other regarding a particular track.

At step 1008, the GID is associated with the respective local track identification data. For example, step 1008 may be performed by associator 106 of FIG. 1 and FIG. 2. Step 1008 is similar to step 910 of FIG. 9. Each of the respective local track identification data is linked with the GID.

At step 1010, the linked relationship is updated in the database, based on the association (step 1008). For example, step 1010 may be performed by associator 106 of FIG. 1 and FIG. 2. The associations generated from step 1008 are used to update the database storing the linked relationships between all common tracks among the plurality of tracking systems. Such an update may occur periodically, according to an embodiment. During periodic updates additional mapping data is received and linked based on the information provided by the respective tracking systems.

Figure 11:
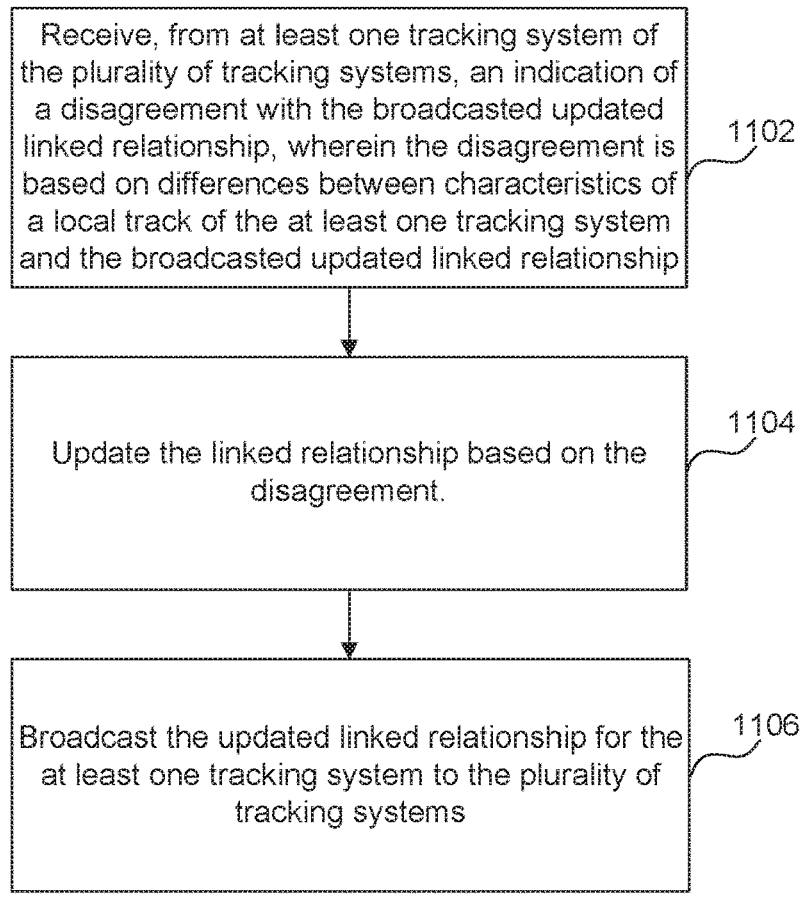
FIG. 11 is a flowchart illustrating a process for managing tracks across a plurality of tracking systems, according to an example embodiment.

FIG. 11 is a flowchart illustrating another process for managing tracks across a plurality of tracking systems, according to an example embodiment.

At step 1102, an indication of a disagreement with the broadcasted linked relationship is received from at least one tracking system of a plurality of tracking systems. The disagreement is based on differences between characteristics associated with a local track within the at least one tracking system and the broadcasted linked relationship. For example, step 1102 may be performed by associator 106 of FIG. 1 and FIG. 2. It is possible for disagreements between tracking systems regarding certain tracks within a cover area. A disagreement may occur when a tracking system, through its calculations or understanding of special circumstances regarding a track or coverage area, determines that a track within their own local coverage area is different from a track Which all other tracking systems may agree is a particular track. As discussed previously, upon receipt of a broadcasted linked relationship, a tracking system may compare the linked relationship with its own tracks and determine if it agrees with the linked relationship. If it disagrees, a message is sent by the tracking system indicating the disagreement and providing track identification data related to the track which it believes to be correct based on its own calculations.

At step 1104, the linked relationships are updated based on the disagreement. For example step 1104 may be performed by associator 106 of FIG. 1 and FIG. 2. Once an indication of a disagreement is received, a new GID may be assigned to the track identification received during step 1102. In an example, a track may have been previously been linked to a first GID, but upon further analysis, the associated tracking system determines that the linked relationship is incorrect. In such a scenario, the previous linked relationship to the first GID is removed and a new and different GID is assigned. The linked relationships are maintained as local track ID to GID pairings.

At step 1106, the updated linked relationships are broadcasted to the plurality of tracking systems. For example step 1104 may be performed by associator 106 of FIG. 1 and FIG. 2. Step 1106 is similar to step 1004 of FIG. 10. Each tracking system is notified of the updated linked relationships and disagreement among tracking systems via the broadcasted message.

Example Computer System

Figure 12:
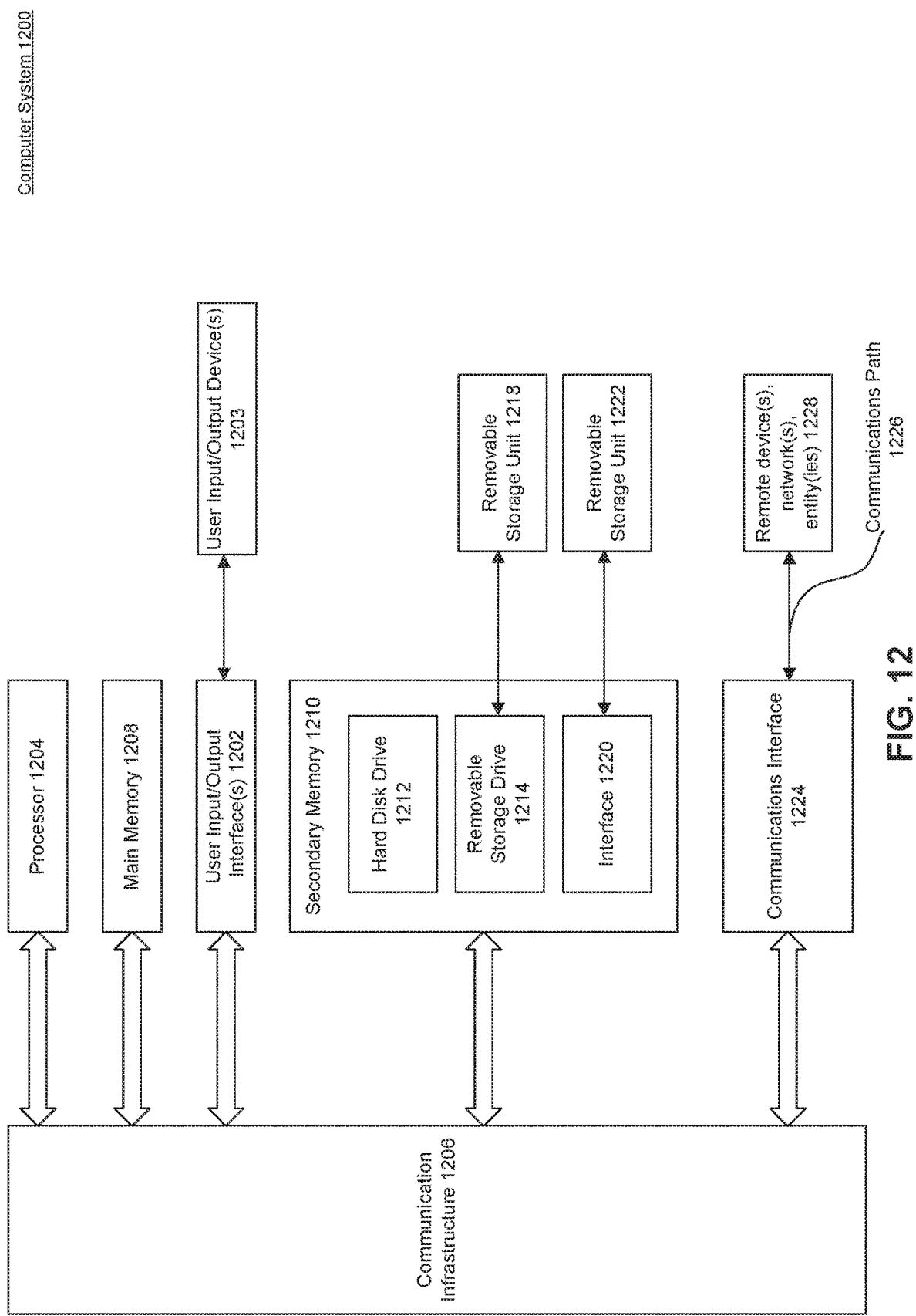
FIG. 12 is an example computer system useful for implementing various embodiments.

Various embodiments can be implemented, for example, using one or more well-known computer systems, such as computer system 1200 shown in FIG. 12. Computer system 1200 can be any well-known computer capable of performing the functions described herein, such as computers available from International Business Machines, Apple, Sun, HP, Dell, Sony, Toshiba, etc.

Computer system 1200 includes one or more processors (also called central processing units, or CPUs), such as a processor 1204. Processor 1204 is connected to a communication infrastructure or bus 1206.

One or more processors 1204 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 1200 also includes user input/output device(s) 1203, such as monitors, keyboards, pointing devices, etc., which communicate with communication infrastructure 1206 through user input/output interface(s) 1202.

Computer system 1200 also includes a main or primary memory 1208, such as random access memory (RAM). Main memory 1208 may include one or more levels of cache. Main memory 1208 has stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 reads from and/or writes to removable storage unit 1218 in a well-known manner.

According to an exemplary embodiment, secondary memory 1210 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communications path 1226, which may be wired and/or wireless, and which may include any combination of LANs, WANs, the Internet, etc. Control logic and/or data may be transmitted to and from computer system 1200 via communication path 1226.

In an embodiment, a tangible apparatus or article of manufacture comprising a tangible computer useable or readable medium having control logic (software) stored thereon is also referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 12. In particular, embodiments may operate with software, hardware, and/or operating system implementations other than those described herein.

Conclusion

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein, Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships thereof (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:
    receiving first track identification data from a first tracking system;
    transmitting the first track identification data to a second tracking system;
    determining that second track identification data of the second tracking system disagrees with the first track identification data; and
    in response to determining that the second track identification data disagrees with the first track identification data, transmitting to the first tracking system information pertaining to the second track identification data.

2. The computer-implemented method of claim 1, wherein the determining comprises:
    receiving the second track identification data from the second tracking system; and
    responsive to receiving the second track identification data, determining that the second track identification data disagrees with the first track identification data.

3. The computer-implemented method of claim 1, wherein the determining comprises:
    monitoring the second tracking system for a response; and
    determining that the second track identification data disagrees with the first track identification data after a predetermined time period has elapsed without detecting a response from the second tracking system.

4. The computer-implemented method of claim 1, wherein the first track identification data is associated with a first global track identifier (GID), the method further comprising:
    receiving the second track identification data from the second tracking system; and
    associating the second track identification data with a second GID.

5. The computer-implemented method of claim 4, wherein the transmitting comprises:
    transmitting the second track identification data and the second GID to the first tracking system.

6. The computer-implemented method of claim I, further comprising:
    associating the first track identification data with a first global track identifier (GID);
    associating the first GID with a physical track;
    disassociating the first GID from the physical track in response to determining that the second track identification data disagrees with the first track identification data; and
    associating the physical track with a second GID corresponding to the second track identification data.

7. The computer-implemented method of claim 1, wherein the first track identification data includes a flight parameter.

8. A system, comprising:
a memory; and
one or more processors coupled to the memory and configured to:
receive first track identification data from a first tracking system;
transmit the first track identification data to a second tracking system;
determine that second track identification data of the second tracking system disagrees with the first track identification data; and
in response to determining that the second track identification data disagrees with the first track identification data, transmit to the first tracking system information pertaining to the second track identification data.

9. The system of claim 8, wherein to determine that the second track identification data disagrees with the first track identification data, the one or more processors are further configured to:
receive the second track identification data from the second tracking system; and
responsive to receiving the second track identification data, determine that the second track identification data disagrees with the first track identification data.

10. The system of claim 8, wherein to determine that the second track identification data disagrees with the first track identification data, the one or more processors are further configured to:
monitor the second tracking system for a response; and
determine that the second track identification data disagrees with the first track identification data after a predetermined time period has elapsed without detecting a response from the second tracking system.

11. The system of claim 8, wherein the first track identification data is associated with a first global track identifier (GID) and wherein the one or more processors are further configured to:
receive the second track identification data from the second tracking system; and
associate the second track identification data with a second GID.

12. The system of claim 11, wherein to transmit to the first tracking system information pertaining to the second track identification data, the one or more processors are further configured to:
transmit the second track identification data and the second GID to the first tracking system.

13. The system of claim 8, wherein the one or more processors are further configured to:
associate the first track identification data with a first global track identifier (GID);
associate the first GID with a physical track;
disassociate the first GID from the physical track in response to determining that the second track identification data disagrees with the first track identification data; and
associate the physical track with a second GID corresponding to the second track identification data.

14. The system of claim 8, wherein the first track identification data includes a flight parameter.

15. A non-transitory tangible computer-readable device having instructions stored thereon that, when executed by at least one computing device, causes the at least one computing device to perform operations comprising:
receiving first track identification data from a first tracking system;
transmitting the first track identification data to a second tracking system;
determining that second track identification data of the second tracking system disagrees with the first track identification data; and
in response to determining that the second track identification data disagrees with the first track identification data, transmitting to the first tracking system information pertaining to the second track identification data.

16. The computer-readable device of claim 15, wherein the determining comprises:
receiving the second track identification data from the second tracking system; and
responsive to receiving the second track identification data, determining that the second track identification data disagrees with the first track identification data.

17. The computer-readable device of claim 15, wherein the determining comprises:
monitoring the second tracking system for a response; and
determining that the second track identification data disagrees with the first track identification data after a predetermined time period has elapsed without detecting a response from the second tracking system.

18. The computer-readable device of claim 15, wherein the first track identification data is associated with a first global track identifier (GID), the operations further comprising:
receiving the second track identification data from the second tracking system; and
associating the second track identification data with a second GID.

19. The computer-readable device of claim 18, wherein the transmitting comprises:
transmitting the second track identification data and the second GID to the first tracking system.

20. The computer-readable device of claim 15, the operations further comprising:
associating the first track identification data with a first global track identifier (GID);
associating the first GID with a physical track;
disassociating the first GM from the physical track in response to determining that the second track identification data disagrees with the first track identification data; and
associating the physical track with a second GID corresponding to the second track identification data.

\* \* \* \* \*

UNITED STATES PATENT AND TRADEMARK OFFICE
CERTIFICATE OF CORRECTION

PATENT NO. : 10,627,504 B2
APPLICATION NO. : 15/812210
DATED : April 21, 2020
INVENTOR(S) : Garrett et al.

It is certified that error appears in the above-identified patent and that said Letters Patent is hereby corrected as shown below:

In the Claims

Column 18, Line 53, please replace "first GM" with --first GID--.

Signed and Sealed this
Ninth Day of June, 2020

Andrei Iancu
*Director of the United States Patent and Trademark Office*